United States Patent
Kwon

(10) Patent No.: US 10,276,897 B2
(45) Date of Patent: Apr. 30, 2019

(54) APPARATUS FOR MANAGING POWER OF A VEHICLE AND A METHOD OF CONTROLLING THE SAME

(71) Applicant: HYUNDAI MOTOR COMPANY, Seoul (KR)

(72) Inventor: Jae Min Kwon, Incheon (KR)

(73) Assignee: Hyundai Motor Company, Seoul (KR)

(*) Notice: Subject to any disclaimer, the term of this patent is extended or adjusted under 35 U.S.C. 154(b) by 325 days.

(21) Appl. No.: 15/251,741

(22) Filed: Aug. 30, 2016

(65) Prior Publication Data
US 2017/0274795 A1  Sep. 28, 2017

(30) Foreign Application Priority Data
Mar. 23, 2016 (KR) .......................... 10-2016-0034517

(51) Int. Cl.
| H01M 10/44 | (2006.01) |
| H01M 10/48 | (2006.01) |
| H02J 7/00 | (2006.01) |
| H02J 9/00 | (2006.01) |

(52) U.S. Cl.
CPC ........... *H01M 10/44* (2013.01); *H01M 10/48* (2013.01); *H02J 7/0031* (2013.01); *H02J 9/002* (2013.01); *H01M 2220/20* (2013.01); *H02J 2007/004* (2013.01); *H02J 2007/005* (2013.01); *Y02T 10/7005* (2013.01)

(58) Field of Classification Search
USPC ............. 307/10.1, 30–31, 131; 320/128, 134
See application file for complete search history.

(56) References Cited

U.S. PATENT DOCUMENTS

| 5,994,790 A * | 11/1999 | Nagashima ............ H02H 3/087 307/10.1 |
| 2001/0035685 A1* | 11/2001 | Tamai .................... H02J 7/1423 307/10.1 |
| 2005/0285445 A1* | 12/2005 | Wruck ...................... H02J 1/14 307/10.1 |
| 2009/0184578 A1* | 7/2009 | Owens ...................... H02J 1/14 307/10.7 |
| 2009/0184686 A1* | 7/2009 | Owens, Jr. ............. H02J 7/0031 320/136 |

FOREIGN PATENT DOCUMENTS

| JP | 2007-0237875 | 9/2007 |
| JP | 2008-0213708 | 9/2008 |
| JP | 2010-0132052 | 6/2010 |
| JP | 2015-120465 | 7/2015 |
| KR | 10-1413424 | 6/2014 |

(Continued)

*Primary Examiner* — Danny Nguyen
(74) *Attorney, Agent, or Firm* — Brinks Gilson & Lione

(57) ABSTRACT

An apparatus for managing power of a vehicle and a method of controlling the same, for effectively shutting off dark current are disclosed. The method includes determining a first battery state when a preset first condition is satisfied; cutting off a first portion load or all loads based on the determination of the first battery state; determining a second battery state when a preset second condition is satisfied; and releasing load interruption or cutting off a second portion load except for the first portion load from the all loads based on the determination of the second battery state.

18 Claims, 4 Drawing Sheets

(56) References Cited

FOREIGN PATENT DOCUMENTS

| KR | 10-1479076 | 1/2015 |
| KR | 10-2015-0044201 | 4/2015 |
| KR | 10-1530071 | 6/2015 |
| KR | 10-2015-0086450 | 7/2015 |
| KR | 10-2015-0117562 | 10/2015 |

* cited by examiner

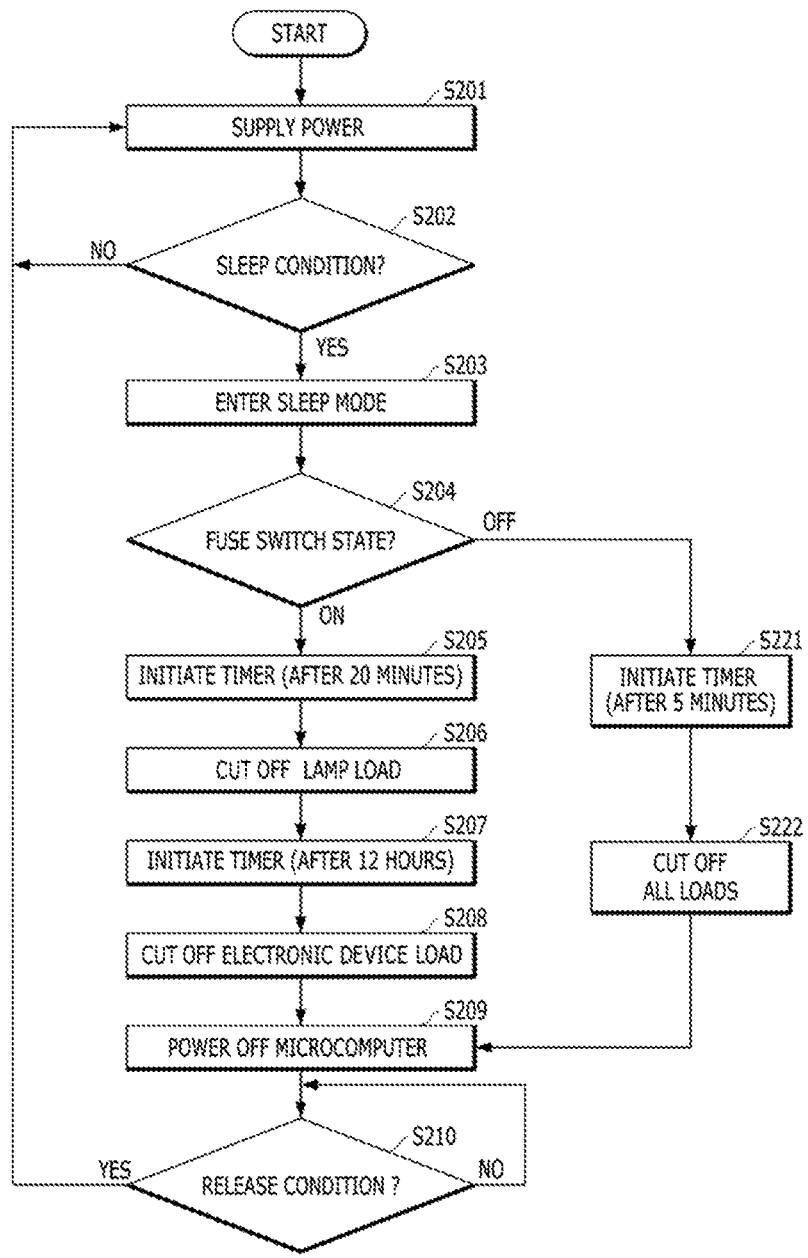

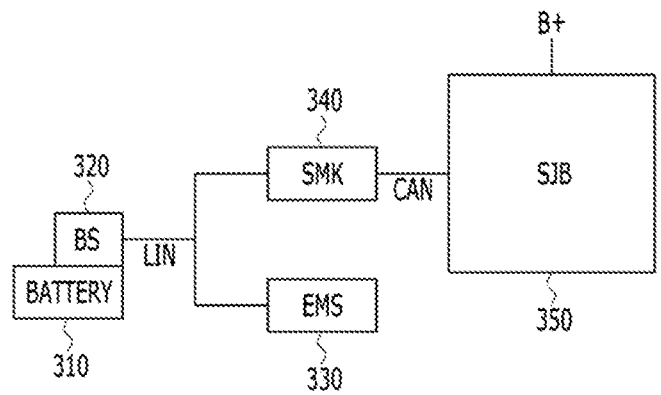
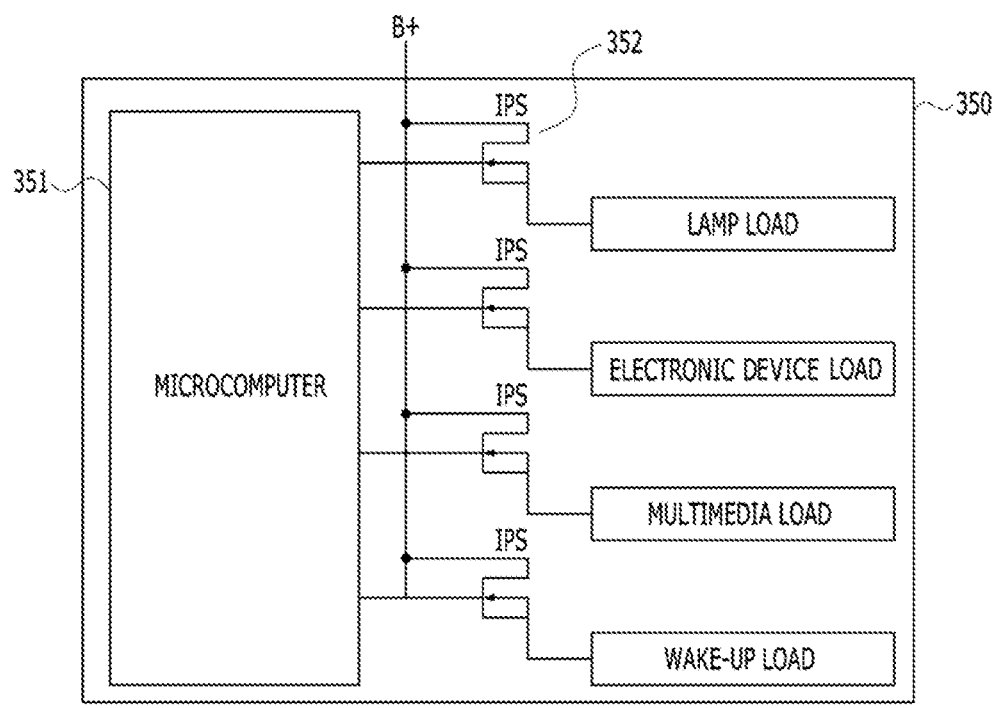

APPARATUS FOR MANAGING POWER OF A VEHICLE AND A METHOD OF CONTROLLING THE SAME

This application claims the benefit of Korean Patent Application No. 10-2016-0034517, filed on Mar. 23, 2016, the entire contents of which is hereby incorporated by reference.

BACKGROUND

Field of the Disclosure

The present disclosure relates to an apparatus for managing power of a vehicle and a method of controlling the same, for effectively shutting off dark current.

Discussion of the Related Art

In general, a vehicle includes a fuse box installed therein that includes fuses for the protection of circuits from power supplied from various electronic apparatuses. However, recently, a smart junction box (SJB) such as a fuse box with a multi-function, as well as a general fuse box function, which includes a micro controller (microcomputer) so as to control operating time of various relay circuits and some electronic apparatuses, has been extensively used in accordance with current trends.

FIG. 1 is a diagram illustrating an example of a configuration of a general smart junction box 100.

Referring to FIG. 1, the smart junction box 100 may include a microcomputer 110 for performing control to supply or shut off power supplied from a battery 210 to various loads in a vehicle by operating a relay and an intelligent power switch (IPS) based on a state of a vehicle switch 230 and a control signal received through a communication unit 220. In addition, the smart junction box 100 may include a fuse switch 120 that is generally turned on after a vehicle is manufactured and transferred to a customer, and the microcomputer 110 may control power supplied to the vehicle using different methods according to a state of the fuse switch 120, which will be described below with reference to FIG. 2.

FIG. 2 is a flowchart illustrating an example of a procedure for managing vehicle power in a general smart junction box.

Referring to FIG. 2, as an external switch input is generated or controller area network (CAN) communication is activated, a smart junction box may supply power to various load systems in a vehicle (S201). When a sleep mode entrance condition is satisfied (e.g., when body CAN communication enters a sleep mode, etc.) after power begins to be supplied (S202), the smart junction box may enter a sleep mode (S203) and perform an operation for shutting off dark current.

The operation for shutting off dark current may be changed according to a state of a fuse switch (S204). In detail, when the vehicle is transferred and the fuse switch is turned on, if a timer is started and predetermined time (e.g., 20 minutes) elapses (S205), a lamp load is firstly cut off (S206) and when longer time (e.g., 12 hours) elapses (S207), a body electronic device load may be cut off (S208). When the body electronic device load is cut off, a microcomputer is powered off (S209) and a corresponding state is maintained until a preset release condition is satisfied (S210). Here, when a locking signal is received through a remote controller such as a smart key after the timer is started, the load may begin to be cut off after a shorter time (e.g., five seconds) elapses. In addition, the preset release condition may include change in external switch input and/or CAN communication activation.

When a fuse switch is in an off state, if a predetermined amount of time (e.g., five minutes) elapses after the timer is started (S211), all loads may be cut off at one time (S222).

However, when the aforementioned smart junction box is applied, since only limited kinds of loads such as a lamp load and a body load are cut off according a fixed time schedule, there is a limit in shutting off dark current.

SUMMARY

Accordingly, the present disclosure is directed to an apparatus for managing power of a vehicle and a method of controlling the same that substantially obviates one or more problems due to limitations and disadvantages of the related art.

An object of the present disclosure is to provide an apparatus for managing power of a vehicle and a method of controlling the same, for effectively shutting off dark current.

In particular, an object of the present disclosure is to provide an apparatus for managing power of a vehicle and a method of controlling the same, for shutting off dark current according to a battery power state.

Additional advantages, objects, and features of the disclosure will be set forth in part in the description which follows and in part will become apparent to those having ordinary skill in the art upon examination of the following or may be learned from practice of forms of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for controlling an apparatus for managing power of a vehicle includes determining a first battery state when a preset first condition is satisfied; interrupting a first portion load or all loads based on the determination of the first battery state; determining a second battery state when a preset second condition is satisfied; and releasing load interruption or interrupting a second portion load except for the first portion load from the all loads based on the determination of the second battery state.

In another aspect of the present disclosure, an apparatus for managing power of a vehicle includes a communication module for receiving information on a battery state, a microcomputer, and an interrupter for interrupting (cutting off) power supply to each of at least one load according to control of the microcomputer. The microcomputer is configured to determine a first battery state when a preset first condition is satisfied and to control the interrupter to interrupt a first portion load or all loads according to a result of the determination of the first battery state, to determine a second battery state when a preset second condition is satisfied and to control the interrupter to release load interruption or to interrupt a second portion load except for the first portion load from the all loads according to a result of the determination of the second battery state.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings:

FIG. 2 is a flowchart illustrating an example of a procedure for managing vehicle power in a general smart junction box;

FIGS. 3A and 3B are diagrams illustrating an example of a configuration of a power management system.

DETAILED DESCRIPTION

Figure 1:
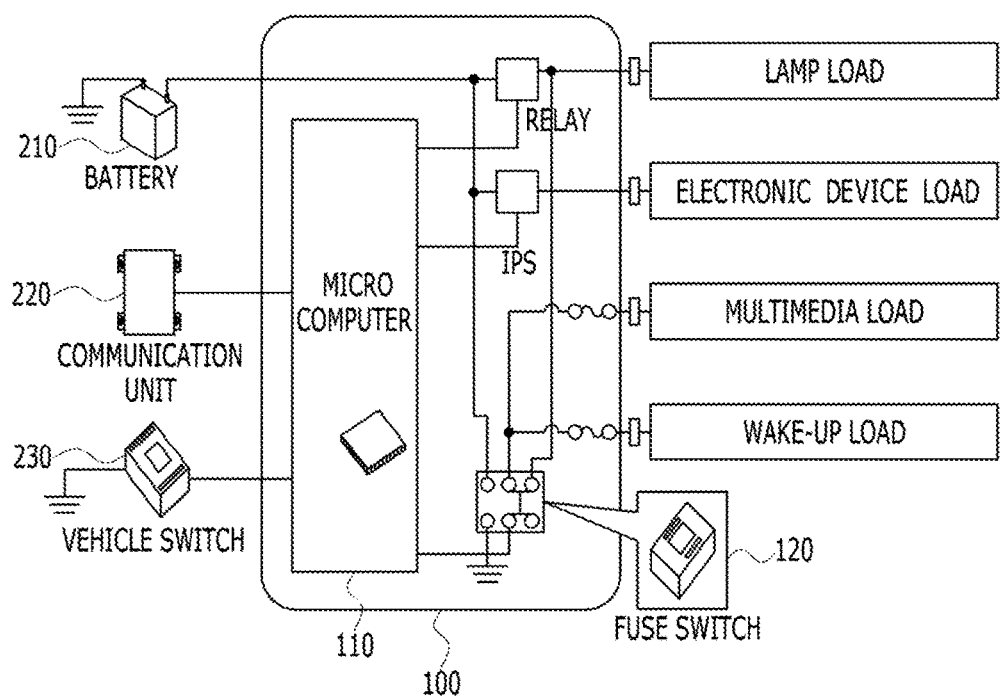
FIG. 1 is a diagram illustrating an example of a configuration of a general smart junction box.

Hereinafter, the present disclosure will be described in detail by explaining exemplary forms of the disclosure with reference to the attached drawings. The same reference numerals in the drawings denote like elements, and a repeated explanation thereof will not be given. In addition, the suffixes "module" and "unit" of elements herein are used for convenience of description and thus can be used interchangeably and do not have any distinguishable meanings or functions.

In the description of the present disclosure, certain detailed explanations of related art are omitted when it is deemed that they may unnecessarily obscure the essence of the disclosure. The features of the present disclosure will be more clearly understood from the accompanying drawings and should not be limited by the accompanying drawings. It is to be appreciated that all changes, equivalents, and substitutes that do not depart from the spirit and technical scope of the present disclosure are encompassed in the present disclosure.

A form of the present disclosure proposes an apparatus for managing power of a vehicle, for determining a range of cut off loads in additional consideration of a battery state as well as elapsed time in order to control shut off of dark current.

In the specification, for convenience of description, an apparatus for managing power of a vehicle is assumed to be a smart junction box (SJB). However, this is merely exemplary and, thus, the apparatus for managing power of a vehicle may be embodied by determining a battery state and requesting an SJB to perform a dark-current shut-off function by another controller.

In forms of the present disclosure, when a state of charge (SOC) of a battery is a predetermined value or less, all loads of the vehicle may be cut off, to ensure future startability.

In forms of the present disclosure, information on an SOC of a battery may be acquired from a battery sensor and another controller instead of an engine controller may control the battery sensor when a vehicle is turned off (i.e., the SOC of the battery may be acquired and transmitted to a power management apparatus). Here, another controller may be a controller such as a smart key controller (SMK) that is turned on even when the vehicle is turned off. In particular, this configuration requires a controller functioning as a LIN master when a local interconnection network (LIN) communication method is used when the battery sensor communicates with an external device and, thus, it may be advantageous to provide a controller that always functions as a LIN master irrespective of whether the vehicle is turned on.

A system for managing power of a vehicle for the above case will be described below with reference to FIGS. 3A and 3B.

FIGS. 3A and 3B illustrate an example of a configuration of a power management system.

Referring to FIG. 3A, a battery sensor 320 may detect a state of charge (SOC) of a battery 310. In this case, when the battery sensor 320 externally transmits the detected SOC information via LIN communication, a LIN master controller may be varied according to whether a vehicle is turned on. For example, when the vehicle is turned on (IGN ON), an engine management system (EMS) 330 may function as a LIN master controller. This is because the EMS 330 needs to periodically monitor battery state information from the battery sensor 320 in an IGN-ON state for power generation and does not have to manage interruption of dark current of the vehicle in an IGN-ON state.

In addition, when the vehicle is turned off (IG OFF), in order to actively shut off dark current according to a vehicle battery state, the SOC information needs to be transmitted to a smart junction box (SJB) 350 and, thus, a smart key controller (SMK) 340 may function as a LIN master controller.

In more detail, the battery sensor 320 may periodically acquire SOC information of a battery and when the SOC is a reference value (e.g., 70%) or less, the SMK 340 may transmit a predetermined communication message (e.g., a low SOC state value) to the SJB 350 to wake up the SJB 350. The awake SJB 350 may shut off dark current according to a procedure illustrated in FIG. 4, which will be described later.

In a general SJB, one fuse switch, one intelligent power switch (IPS), and one relay are applied. However, the SJB 350 according to forms of the present disclosure may apply IPSs 352 controlled by a microcomputer 351 for respective loads as illustrated in FIG. 3B.

Hereinafter, a procedure for managing power of an SJB will be described with reference to FIG. 4.

Figure 4:
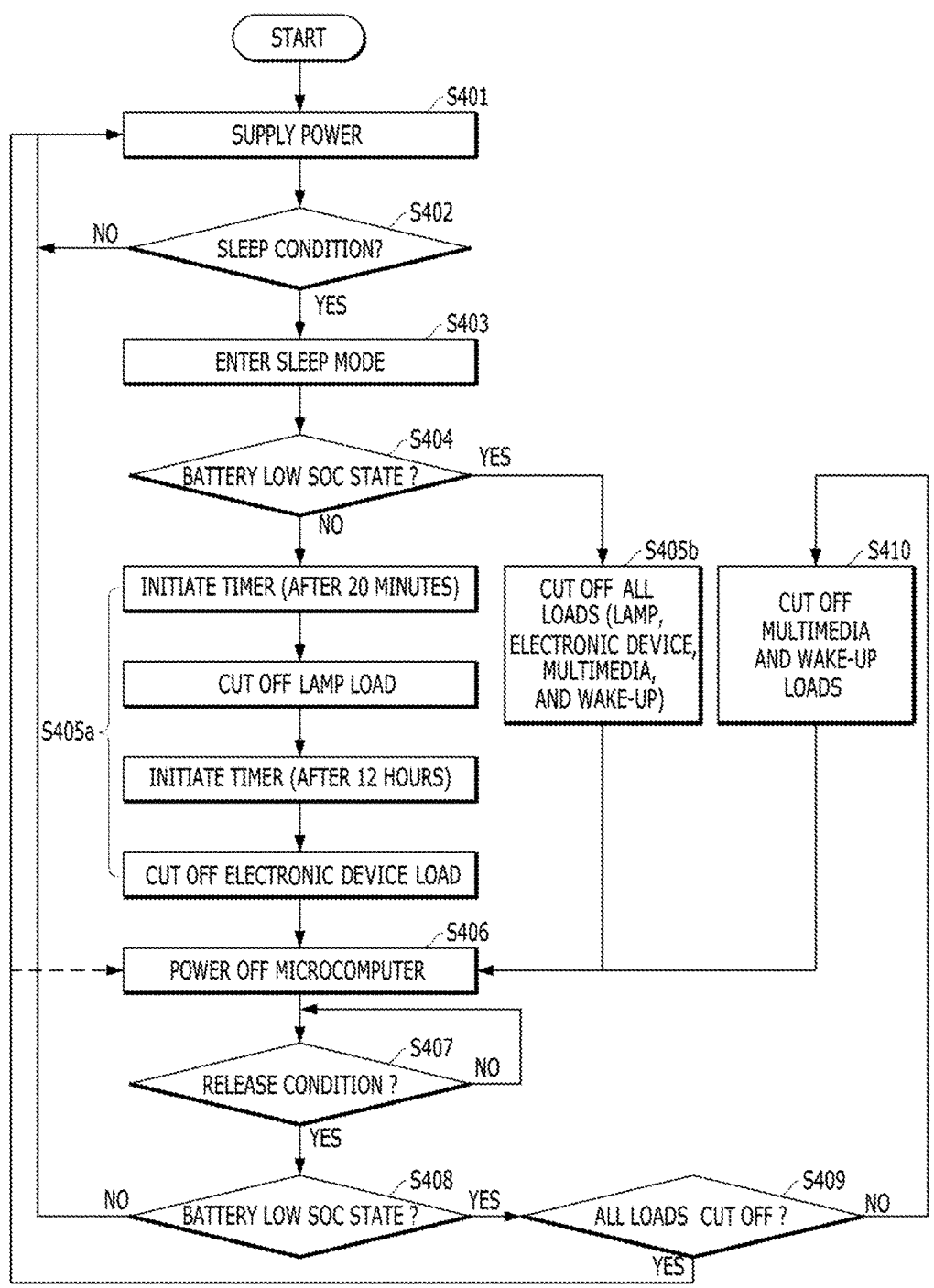
FIG. 4 is a diagram illustrating an example of a procedure for managing power in consideration of a battery state in a vehicle.

FIG. 4 is a diagram illustrating an example of a procedure for managing power in consideration of a battery state in a vehicle.

In FIG. 4, operations S401 to S403 are similar to operation S201 to S203 of FIG. 2 and operation S405a is similar to operations S205 to S208 of FIG. 2 and, thus, a repeated description will be omitted for clarify.

In a general SJB, different loads are cut off according to a state of a fuse switch. However, as illustrated in FIG. 4, different loads may be cut off according to a battery SOC. This may be roughly classified into three cases and will be described below.

A first case refers to a state just before a battery is discharged when an SOC of the battery is a predetermined level (e.g., 70%) or less after entrance into a sleep mode (S404). Accordingly, an SJB may immediately cut off all loads (S405b) and enter a microcomputer power-off mode to delay battery discharge as much as possible (S406).

As a second case, when a SOC of a battery is normal after entrance into a sleep mode (S404), some loads are shut off according to time via a general method (S405a) and the battery may enter a microcomputer power-off mode (S406). Then, when a sleep mode release condition such as a change in external switch input or reception of a request for activation via CAN communication is satisfied (S407), whether all loads are cut off or power is supplied may be determined (S409) according to the SOC of the battery (S408). As the determination result, when the SOC of the battery is a reference value or more, there is no problem in terms of car starting and, thus, power may be immediately supplied to loads (to operation S401). This is because, when a vehicle is left alone for a long period of time after entrance into a microcomputer power-off mode, the battery SOC is degraded to a predetermined level or less and, thus, the battery SOC may be re-checked before power is supplied to the vehicle.

As a third case, when a sleep mode release condition is satisfied (S407) and a battery SOC is determined to be equal to or less than a reference value, an SJB may determine whether all loads are cut off (S409) and when all loads are not cut off, non-cut off loads (i.e., a multimedia load and a wake-up load) are cut off (S410), which is performed in order to prevent additional dark current from being generated. Then, along with entrance into a microcomputer power-off mode (SS406), time may be delayed until a battery of a vehicle is entirely discharged.

In operation S409, when all loads are determined to be already shut off, the SJB may re-enter a microcomputer power-off mode according settings (S406) and when a release condition is re-satisfied after all loads are cut off, a driver may want to use a load and, thus, power may be applied to each load (S401).

According to at least one form of the present disclosure, the following advantages may be achieved.

Dark current of a vehicle may be effectively shut off so as to prevent unnecessary battery consumption.

In particular, it may be more effective to determine a range of cut off loads according to a battery state of a vehicle.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

The disclosure can also be embodied as computer readable codes on a computer readable recording medium. The computer readable recording medium is any data storage device that can store programs or data which can be thereafter read by a computer system. Examples of the computer readable recording medium include Hard Disk Drive (HDD), Solid State Disk (SSD), Silicon Disk Drive (SDD), read-only memory (ROM), random-access memory (RAM), CD-ROMs, magnetic tapes, floppy discs, optical data storage devices, and so on. In addition, the computer readable recording medium may be embodied in the form of Internet wave (e.g., transmission over the Internet).

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method for controlling an apparatus for managing power of a vehicle, the method comprising:
    determining a first battery state when a preset first condition is satisfied;
    cutting off all loads when the first battery state is equal to or more than a reference value based on the determination of the first battery state;
    cutting off a first portion load when the first battery state exceeds the reference value based on the determination of the first battery state;
    determining a second battery state when a preset second condition is satisfied; and
    releasing load cut off or cutting off a second portion load except for the first portion load among the all loads based on the determination of the second battery state.

2. The method according to claim 1, wherein the cutting off of the first portion load comprises sequentially cutting off different loads according to a timer value.

3. The method according to claim 1, wherein the releasing of load cut off or the cutting off of the second portion load comprises:
    determining whether the all loads are cut off when the second battery state is equal to or more than a reference value as a result of the determination of the second battery state; and
    cutting off the second portion load when the all loads are cut off.

4. The method according to claim 3, wherein the releasing of load cut off or the cutting off of the second portion load comprises releasing the load cut off when the second battery state exceeds a reference value as a result of the determination of the second battery state.

5. The method according to claim 1, wherein the battery state comprises state of charge (SOC) information.

6. The method according to claim 5, wherein the SOC information is transmitted from a smart key controller (SMK).

7. The method according to claim 6, wherein the SMK acquires the SOC information from a battery sensor when a vehicle is turned off (IG OFF state).

8. The method according to claim 7, wherein the SMK is operated as a local interconnection network (LIN) master controller in the IG OFF state when the SMK is connected to the battery sensor via LIN communication.

9. A computer readable recording medium having recorded thereon a program for executing the method according to claim 1.

10. An apparatus for managing power of a vehicle, the apparatus comprising:
    a communication module configured to receive information on a battery state;
    a microcomputer; and
    an interrupter configured to cut off power supplied to each of at least one load according to control of the microcomputer,
    wherein the microcomputer is configured to:
        determine a first battery state when a preset first condition is satisfied;
        control cut off of all loads when the first battery state is equal to or more than a reference value based on the determination of the first battery state;
        control cut off of a first portion load when the first battery state exceeds the reference value based on the determination of the first battery state; and
        determine a second battery state when a preset second condition is satisfied and to control the interrupter to release load cut off or to cut off a second portion load except for the first portion load from the all loads according to a result of the determination of the second battery state.

11. The apparatus according to claim 10, wherein the microcomputer is configured to sequentially cut off different loads according to a timer value from the first portion load.

12. The apparatus according to claim 10, wherein the microcomputer is configured to determine whether all the loads are cut off when the second battery state is equal to or more than a reference value as a result of the determination of the second battery state, and configured to cut off the second portion load when the all loads are cut off.

13. The apparatus according to claim 12, wherein to release load cut off or to cut off of the second portion load, the microprocessor is configured to release the load cut off when the second battery state exceeds a reference value as a result of the determination of the second battery state.

14. The apparatus according to claim 10, wherein the battery state comprises a state of charge (SOC) information.

15. The apparatus according to claim 14, wherein the SOC information is transmitted from a smart key controller (SMK).

16. The apparatus according to claim 15, wherein the SMK acquires the SOC information from a battery sensor when a vehicle is turned off (IG OFF state).

17. The apparatus according to claim 16, wherein the SMK is operated as a local interconnection network (LIN) master controller in the IG OFF state when the SMK is connected to the battery sensor via LIN communication.

18. The apparatus according to claim 10, wherein:
the apparatus comprises a smart junction box (SIB); and
the interrupter comprises an intelligent power switch (IPS).

* * * * *